May 13, 1952     L. J. GIOSSI     2,596,675

SOAP TRAY

Filed May 10, 1948

INVENTOR.
Louis J. Giossi
BY
Frank C. Maley
Agent

Patented May 13, 1952

2,596,675

UNITED STATES PATENT OFFICE 2,596,675

SOAP TRAY

Louis Joseph Giossi, Brooklyn, N. Y.

Application May 10, 1948, Serial No. 26,047

1 Claim. (Cl. 45—28)

This invention relates to improvements in soap dishes or trays and the like and pertains more particularly to receptacles, whether of dish or tray type, designed to contain the cake or bar of soap in position accessible for service use, whether the service be bathing, washing or cleansing of articles, etc.

Cakes or bars of soap, when in use, become surface-wetted and more or less slippery due to the fatty ingredients partially or wholly dissolving. Until the surface becomes dry, the cake or bar, due to the condition of its surface, is difficult to retain in a fixed position. It readily slips out of the hands of the user, freely moves over any surface on which it may rest or come to rest and it frequently provides the source of accidents as when a bather accidentally steps thereon while taking a bath. In addition, soap in a moist condition, slowly dissolves and thus is wasted.

Various fixtures have been provided and contemplated to meet the conditions thus presented. These have been in the form of receptacles of various types, generally in the form of trays in which the cake or bar rests flatwise in an approximate horizontal plane. Since it is desirable that the moisture content of the cake or bar surface be eliminated as early as possible, it is the practice to make such trays reticulated to permit access of air to the surface, as by the use of wire formations or sheet metal containing many openings. While these permit drying out after a time period, they also provide the tendency to roughen to some extent the surface of the cake or bar, due to the fact that inasmuch as the moisture penetrates below the surface, a film or thin zone of the latter softens sufficiently as to permit penetration of the wires or other supporting surface. This is especially true where the cake or bar is in the early stages of its use, at which time its dimensions and weight approach those of the unused cake or bar. Obviously, the portion of the cake or bar which is actually out of contact with the supporting surface may pass into the interstices present, and, becoming dried out, tend to set up the roughened condition. Where the cake or bar has had extended service and has become relatively thin, it is likely to pass through such trays, especially of the wire type, unless extreme care is taken when placing the cake or bar within the tray.

It has been contemplated to provide the support in the form of a receptacle of considerable depth, into which the cake or bar is received endwise with the cake or bar entirely within the receptacle, to prevent it from toppling out. Such structure, while provided with a hinged bottom to permit ready removal, makes moisture removal from the cake surface difficult since the walls shield the cake or bar from currents of air, so that drying out of the surface is exceedingly slow. If the bottom permits collection of moisture or water, the moisture-laden air may so prolong the drying-out action as to permit deeper penetration of the surface and tend to soften up the latter instead of its being dried out.

The present invention, while of this latter type, is so formed as to avoid these conditions. The cake or bar is positioned in endwise position, but is so positioned as will permit practically free air circulation over the surface. The cake or bar is partially exposed above the receptacle, but cannot be toppled therefrom. The hinged bottom permits ready passage of the cake or bar through the bottom opening, but the bottom is so arranged as to permit any moisture or water to drain out, and provides a location where entrance of air can aid in air circulation within the receptacle. The side faces of the cake or bar have minimum contact with the walls of the receptacle. These are a few of the advantageous features of the invention, which is so formed as to be readily positioned for accessible service, and is readily manufactured at a reasonable cost.

To these and other ends, therefore, the nature of which will be made apparent as the invention is hereinafter disclosed, said invention consists in the improved constructions and combinations of parts hereinafter particularly described, illustrated in the accompanying drawings, and more particularly pointed out in the appended claim.

In the accompanying drawings, in which similar reference characters indicate similar parts in each of the views—

Figure 1:
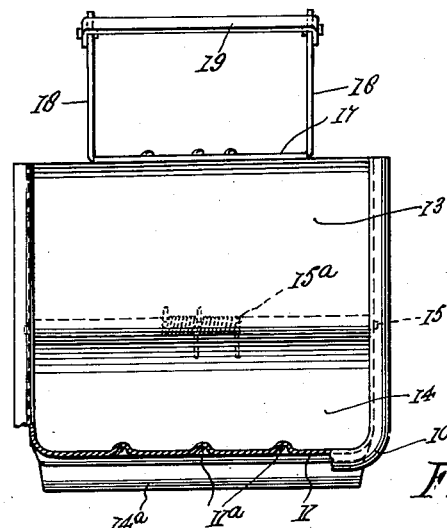
Figure 1 is a top plan view, partly in section, of a receptacle according to the present invention.
Figure 2:
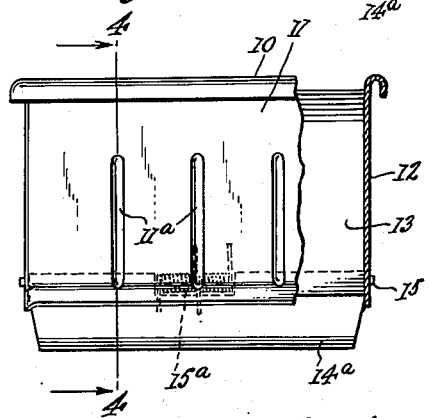
Fig. 2 is a front elevation, partly in section, of the same.
Figure 3:
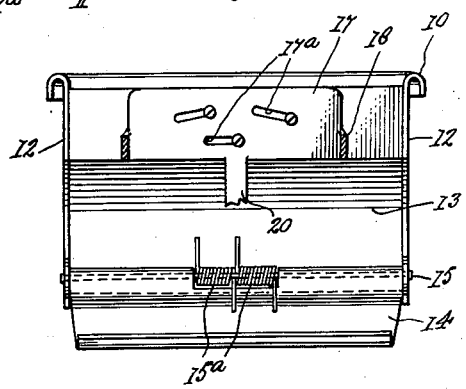
Fig. 3 is a rear view, with parts broken away.

The body of the soap receptacle 10 of the present invention is formed with a vertical front wall 11, opposing vertical end walls 12, and a rear wall 13, the latter being a curved wall convex relative to the interior of the receptacle. The front and side walls are generally planar, the front wall being formed with spaced vertical indentations to form internal ribs 11a, but each of these walls is formed with a rounded upper marginal formation, as by a beaded formation or, as shown, an outward and downward curving of the margins, thus avoiding the presence of a thin edge of the top of the receptacle.

An important feature of the above structure is the form of the rear wall 13, which, as shown, is curved more or less arcuately on a vertical section through the wall, the curvature approaching the vertical within the lower zone and receding rapidly in the upper zone. The lower end of wall 13 is spaced rearwardly of the front wall 11 a distance sufficiently greater than the thickness of the unused cake or bar of soap to permit ready positioning therein. Its upward course begins with a slow curve effect for a partial distance, and then the curvature leads in a rearward direction with a constant increase in distance from the front wall, thus providing an interior which flares outwardly and rearwardly toward the open top. The rear marginal zone of the rear wall is in the form of a downwardly extending zone 13a which forms a support for the positioning means presently described.

To assure stability, the side walls 12 are of greater area than the area of a section of the receptacle interior, the rear edge of the side wall extending from the lower zone to the bottom of flange 13a, the ends of the rear wall being secured to the side walls, as by soldering, welding, or the like, remote from the actual rear edges of the side walls, excepting within the flange zone.

Figure 4:
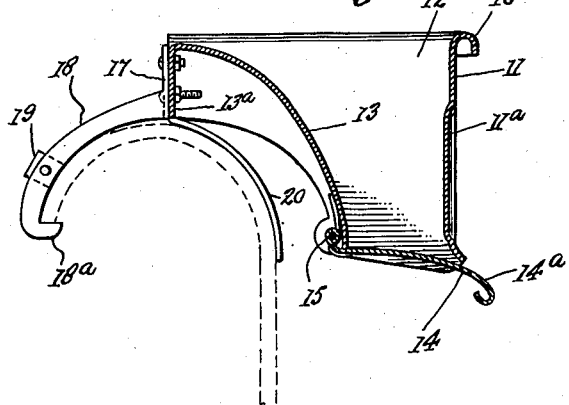
Fig. 4 is a sectional view taken on line 4—4 of Fig. 2.
Figure 5:
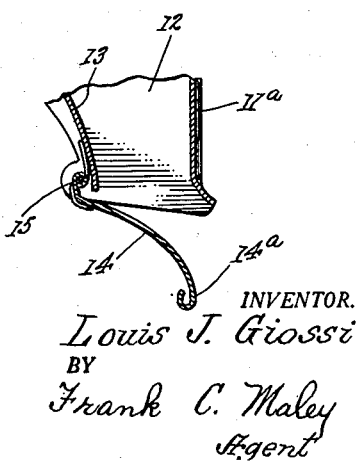
Fig. 5 is a fragmentary sectional view of the lower zone and showing the hinged bottom as in partially open position.

The bottom of the receptacle is approximately closed by a pivoted door or gate 14, preferably convex to the receptacle interior. The rear end of the door is supported on a hinging structure 15, with the latter including a pair of springs 15a of sufficient power to not only hold the door in its substantially closed position, but to provide this result when the cake or bar is being supported by the door. The door dimensions are such as to provide a zone which extends forward of the front wall to provide an exposed fingerpiece 14a which permits the user to readily open the door for the escape of the cake or bar within the receptacle and which can fall into the hand actuating the door. As indicated in Fig. 4, the door in its closing position, extends between the side walls but is beneath the front wall and has no sealing relation with either of these walls. Since the door in its closing position inclines downwardly toward the front wall, the arrangement permits the escape of any water or moisture which may reach the bottom zone of the receptacle, thus providing for efficient drainage. Since the door is yieldingly held in closed position by springs 15a with the door free from connection with the front wall, it will be understood that the weight of the cake or bar is being applied in opposition to the spring, so that the door will have no tight fit with the front wall, thus not only permitting efficient drainage but also to provide for the entrance of air at such point to aid in creating air flow through the receptacle.

For the purpose of supporting the receptacle conveniently, as upon the wall of a bath tub or a sink or the like, the flange 13a carries a fixture of suitable type, that shown in the drawings being in the form of a plate 17, bolted or otherwise secured to the flange. This plate carries a pair of spaced arms 18, curved downwardly and rearwardly and terminating in inwardly extending projections 18a, which can pass beneath a ledge of the top of the bath tub, as shown in Fig. 4. If desired, the arms may be connected by a brace 19 and plate 17 may include a slot or slots 17a to permit adjustment of the plate lengthwise of flange 13a. The plate 17 also preferably includes an arm or finger 20 extending in the opposite direction to arms 18 and curved downwardly, as in Fig. 4. The arm 20 lies on the top of the tub and arms 18 and 20 thus definitely position the receptacle upon the rim of the bath tub, with the door 14 inward of the tub.

The height of the front wall of the receptacle is materially less than the length of commercial unused cakes or bars of soap, so that with the cake or bar in position, its upper zone will be exposed, thus permitting greater access of air to the positioned cake or bar. When the unused cake or bar is introduced, it extends approximately upright due to the form of the lower portion of rear wall 13 and the front to rear dimensions of the lower zone of the receptacle; since the door is inclined downwardly or convex, the tendency may be to tend to cant the cake or bar forwardly, but ribs 11a form faces which limit material surface contact with the front wall 11. As the cake or bar becomes smaller, through use, it may assume a position canting backward at the top, but due to the curvature of the rear wall, the contact of that wall will generally be at an intermediate point in the length of the cake or bar and only when the cake or bar dimensions become very small is the contact with the rear wall practically at the top of the cake or bar.

In other words, the structure is such that the cake or bar is so positioned as to permit ready access of air thereto to aid in the elimination of moisture from the surface. No material moisture can gather within the receptacle due to the free drainage possible, thus enabling free drying out conditions for the positioned cake or bar. The wide flaring mouth assures ready access of the cake or bar to the receptacle and the shape of the rear wall assures its reaching the desired resting position, an arrangement of definite advantage to a bather required to place the cake or bar within the receptacle under groping conditions.

The assembly is of rigid structure, since the ends of flange 13a are secured to the excess area of the side walls, assuring that the flange will be stable and thus sustain the weight of the receptacle and its content in its position of being practically suspended in overlying relation to the interior of the bath tub or sink. The walls are of sheet metal so that the assembly is of a weight characteristic not likely to mar the structure on which it is mounted. If desired, the structure may be provided in different sizes and materials, with a size dimension based on the dimensions of unused cakes or bars of soap.

While I have thus described a preferred form of the invention, it is apparent that changes and/or modifications therein may be found desirable or essential in meeting the various exigencies of service or the individual desires of a particular user, and I, therefore, reserve the right to make any and all such changes and/or modifications therein as may be found so desirable or essential insofar as the same may fall within the spirit and scope of the invention as expressed in the accompanying claim, when broadly construed.

What is claimed as new is:

A soap dish comprising an elongated receptacle of appreciably greater length than depth to receive therein a bar of soap in upstanding edgewise relation, said receptacle having upright front and end walls and a rear wall joined together, and a pivoted door closing the bottom of the receptacle, said rear wall extending between the end walls and being curved convexly upwardly and rearwardly from the bottom edge thereof and forming an inner convex abutment to cause a bar of soap dropped into the receptacle to be turned over edgewise onto the bottom door, in close proximity beside the front wall, and spaced upright projecting ribs in the front wall extending inwardly of the receptacle to hold the bar of soap spaced from the front wall.

LOUIS JOSEPH GIOSSI.

REFERENCES CITED

The following references are of record in the file of this patent:

UNITED STATES PATENTS

| Number | Name | Date |
| --- | --- | --- |
| 1,260,045 | Rautzenberg | Mar. 19, 1918 |
| 1,298,215 | Idone | Mar. 25, 1919 |
| 1,339,166 | Collins | May 4, 1920 |
| 1,560,871 | Smith | Nov. 10, 1925 |
| 1,872,816 | Ringland | Aug. 23, 1932 |
| 2,036,204 | Enssle | Apr. 7, 1936 |
| 2,490,657 | Shuman | Dec. 6, 1949 |

FOREIGN PATENTS

| Number | Country | Date |
| --- | --- | --- |
| 4,656 | Great Britain | 1913 |